A. KITA.
ELECTRIC RAT TRAP.
APPLICATION FILED JUNE 3, 1911.
1,034,251.
Patented July 30, 1912.
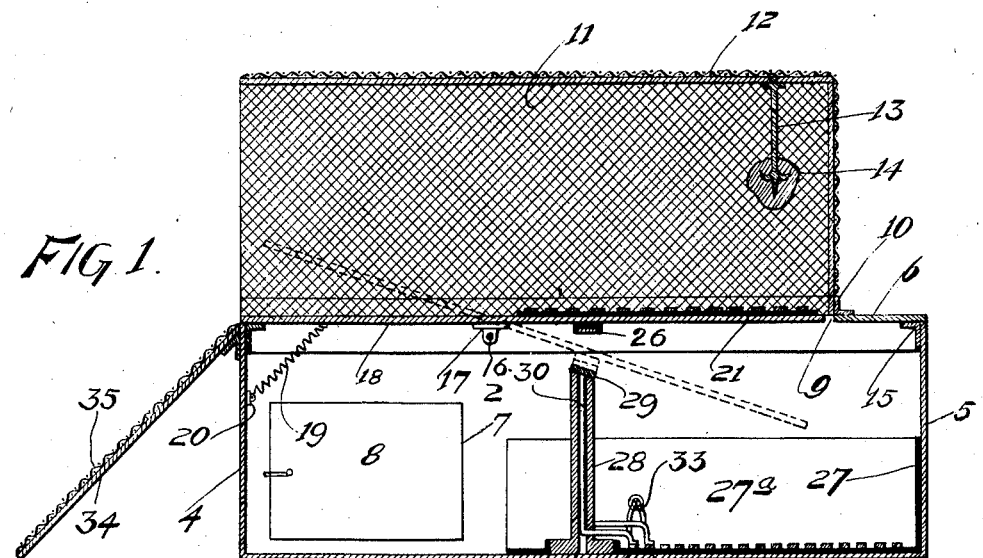
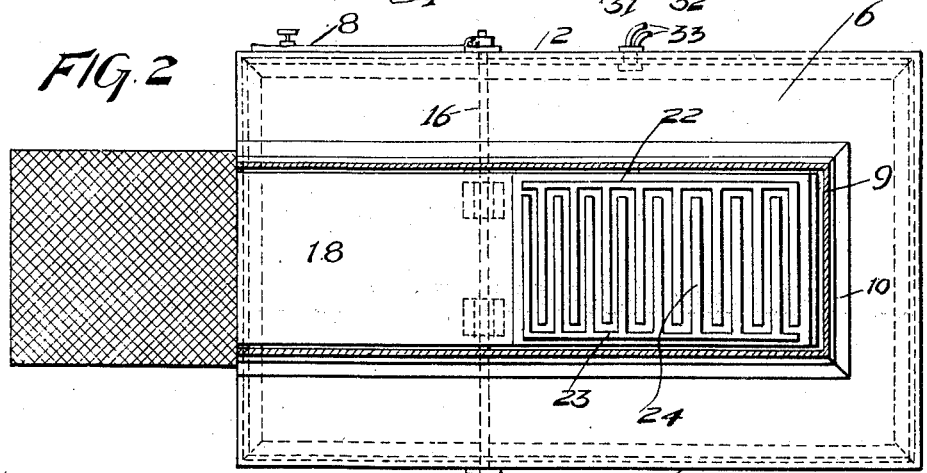
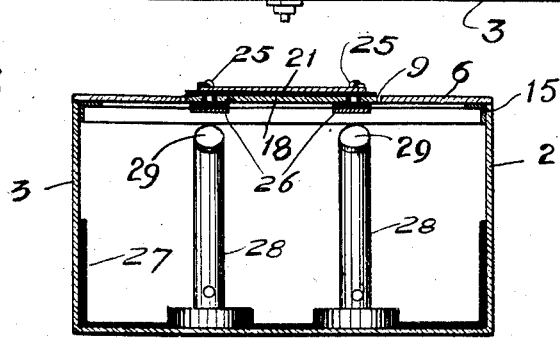
WITNESSES:
Erich Burkly
K. H. Butler
INVENTOR.
A. KITA.
BY
ATTORNEYS.

UNITED STATES PATENT OFFICE.

ANDY KITA, OF EPTON, PENNSYLVANIA.

ELECTRIC RAT-TRAP.

1,034,251.  Specification of Letters Patent.  Patented July 30, 1912.

Application filed June 3, 1911. Serial No. 630,987.

*To all whom it may concern:*

Be it known that I, ANDY KITA, a citizen of the United States of America, residing at Epton, in the county of Allegheny and State of Pennsylvania, have invented certain new and useful Improvements in Electric Rat-Traps, of which the following is a specification, reference being had therein to the accompanying drawing.

This invention relates to electric rat traps, and the objects of my invention are to furnish a trap with electric means for subjecting a body of a rat to a double charge of electricity to insure a thorough extermination of life, and to provide a trap that can be safely handled and advantageously used in connection with wharves, storage houses and buildings infested with rodents.

With the above and other objects in view the invention resides in the novel construction, combination and arrangement of parts to be hereinafter specifically described and then claimed.

Reference will now be had to the drawing, wherein:—

Figure 1 is a longitudinal sectional view of the trap. Fig. 2 is a horizontal sectional view of the same, and Fig. 3 is a cross sectional view of a portion of the trap.

A trap in accordance with this invention comprises a box or receptacle having a bottom plate 1, side walls 2 and 3, end walls 4 and 5 and a top plate 6.

The side wall 2, adjacent to the end wall 4, is provided with a doorway 7 normally closed by a hinged door 8, and this door is employed whereby easy access can be had to the interior of the box or receptacle to remove the bodies of rodents after having life exterminated.

The top plate 6 is provided with a longitudinal opening 9 and surrounding the upper edges of this opening are angle bars 10 supporting the frame work 11 of a cage 12, said cage having the end thereof open directly above the wall 4. The cage 12 is preferably made of interwoven wire, and adjacent to the closed end thereof, the frame work 11 of the cage has a depending bait holder 13 for a bait 14.

The top plate 6 is braced by an angle bar 15 arranged around the upper inner edges of the walls of the box or receptacle. Arranged transversely of the box or receptacle is a pivot rod 16 having the ends thereof extending through the angle bar 15 and the walls 2 and 3. Pivotally mounted upon the transverse pivot rod 16 are the bearings 17 of a tiltable trap door 18, said door being arranged in the opening 9 with the forward end thereof resting upon the upper edge of the wall 4 and the angle bar 15. The tiltable trap door 18 is normally retained in a closed position by a retractile spring 19 having the lower convolution thereof connected to the one side of the end wall 4, as at 20 and the upper convolution to the under side of the trap door 18.

Arranged upon the rear or inner end of the tiltable trap door 18 is a plate of insulation 21 and arranged upon the plate of insulation are contact bars 22 and 23 having lateral extensions 24 alternately arranged in parallelism. The contact bars 22 and 23 are connected by wires 25 to insulated contact pieces 26 carried by the under side of the trap door 18.

A portion of the inner sides of the walls 2, 3 and 5 and the bottom plate 1 are lined with plates of insulation 27 providing an insulated compartment 27$^a$ adapted to receive the bodies of rats. Arranged in this compartment are two tubular contact posts 28 having the upper ends thereof beveled and provided with contact blocks 29 adapted to be engaged by the contact pieces 26. The contact blocks 29 are connected by wires 30 to contact bars 31 and 32 arranged upon the bottom of the compartment 27$^a$, said wires extending through the tubular posts 28. The contact bars 31 and 32 have lateral extensions similar to the bars 22 and 23, and the bars 31 and 32 are connected to leading in-wires 33 that extend through the wall 2 and the insulated lining thereof.

To facilitate a rat entering the cage 12, the end wall 4 is provided with a gang plank 34 covered with a sheet of interwoven wire 35 to facilitate the rat obtaining a foot-hold upon the gang plank.

When a rat enters the cage 12 to obtain the bait 14, the trap door 18 is over-balanced and when the contact pieces 26 engage the blocks 29, an electric circuit is immediately completed through the contact bars 22 and 23 and the lateral extensions thereof. The body of the rat is immediately shocked and rolls off of the lower end of the trap door 18. When the body of the rat contacts with the bars 31 and 32 and the extensions thereof, the rat again receives a charge of electricity that thoroughly exterminates life.

The trap door 18 is restored to its normal position through the medium of the retractile spring 19, and it is preferable to examine the trap as often as possible to remove the rodent's body, whereby a short circuit will be obviated and the trap again placed in condition to entrap and electrocute another rat.

What I claim is:—

1. An electric rat trap comprising a receptacle having a tiltable trap door at its top, said trap door having a portion of its face provided with insulation, contact bars upon said insulation, spaced apart contact blocks mounted on the under face of said door and insulated therefrom, said contact bars and contact blocks having circuit connections, conductor posts within said receptacle, each post having its top provided with a contact block adapted to form contact with the corresponding blocks of the door when the latter is tilted, and leading-in wires extending into said receptacle and electrically connected to the post contact blocks, said leading-in wires being adapted to be connected with opposite sides of a source of energy.

2. An electric rat trap comprising a receptacle having a tiltable trap door at its top, said trap door having a portion of its face provided with insulation, contact bars upon said insulation, spaced-apart contact blocks mounted on the under face of said door and insulated therefrom, said contact bars and contact blocks having circuit connections, conductor posts within said receptacle, each post having its top provided with a contact block adapted to form contact with the corresponding blocks of the door when the latter is tilted, contact bars positioned at the bottom of said receptacle and electrically connected to the conductors in said posts, and leading-in wires connected to said receptacle contact bars to form an electrocuting circuit, said bars forming a portion of the current path to the post contact plates.

3. In a rat trap and in combination a source of electric energy, a receptacle having a tilting platform, contact bars carried by said platform and insulated from each other, said bars being adapted to form terminals of an electrocuting circuit when connected with said source of energy, said bars being normally out of such connection, and contact bars carried by the receptacle below said platform and permanently in circuit with opposite sides of said source, said platform bars being brought into the circuit connection by the tilting of the platform.

4. In a rat trap and in combination a source of electric energy, a receptacle having a tilting platform, contact bars carried by said platform and insulated from each other, said bars being adapted to form terminals of an electrocuting circuit when connected with said source of energy, said bars being normally out of such connection, and contact bars carried by the receptacle below said platform and permanently in circuit with opposite sides of said source, said platform bars being brought into the circuit by the tilting of the platform, the bottom contact bars forming a portion of the current path for said connection.

5. In an electric trap, the combination with a suitable source of electrical energy, of a box, a casing located upon said box and having one end provided with a passage-way, a spring supported platform pivotally mounted in said casing, electrode supports below said platform, electrodes carried by and insulated from said supports and in circuit with opposite sides of said source of electrical energy, a pair of contact bars arranged upon and insulated from said platform and adapted to be placed in circuit with said electrodes when the platform is tilted by the weight of a rodent's body.

6. In combination with a suitable source of electrical energy, of a casing having a passage-way thereinto, a pivotally-mounted platform in said casing, means for counterbalancing the weight of said pivoted platform, electrode supports contiguous said platform, electrodes carried by and insulated from said supports and in circuit with opposite sides of said source of electrical energy, a pair of contact bars arranged upon and insulated from said platform and adapted to be placed in circuit with said electrodes when the platform is tilted by the weight of a rodent's body.

In testimony whereof I affix my signature in the presence of two witnesses.

ANDY KITA.

Witnesses:
  Andy Isakson,
  Yos Kitta.